Figure 1:
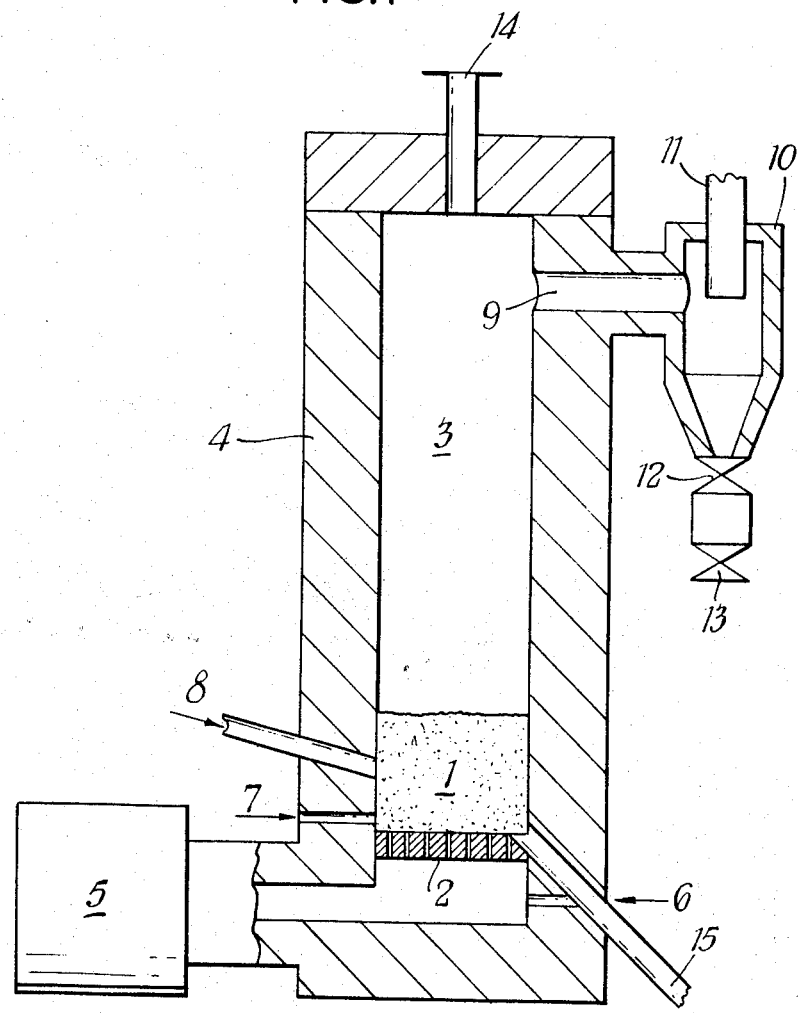

United States Patent [19]

Vollans

[11] 3,775,040
[45] Nov. 27, 1973

[54] HEAT TREATMENT OF PARTICULATE MATERIALS
[75] Inventor: Edgar Colin Vollans, St. Austell, England
[73] Assignee: English Clays Lovering Pochin & Company Limited, Cornwall, England
[22] Filed: June 29, 1971
[21] Appl. No.: 157,991

[30] Foreign Application Priority Data
July 1, 1970   Great Britain.................. 32,025/70

[52] U.S. Cl. ................................. 432/15, 432/58
[51] Int. Cl. ............................................. B01d 3/00
[58] Field of Search...................... 263/21 A; 34/10, 34/57 A; 432/15, 58

[56]     References Cited
        UNITED STATES PATENTS
2,654,659  10/1953  Friedman......................... 432/58 X
2,774,661  12/1956  White ............................ 263/21 A X
3,022,989   2/1962  Pyzel............................. 263/21 A X
3,349,500  10/1967  Woll ..................................... 34/10

Primary Examiner—William F. O'Dea
Assistant Examiner—Harold Joyce
Attorney—Stevens, Davis et al.

[57]          ABSTRACT

A particulate material is heat treated, e.g. calcined, by being passed through a fluidised bed comprising particles of an inert refractory material. Throughout the period in which the particulate material is passing through the fluidised bed, the fluidised bed contains a major proportion by weight of the inert refractory material. The size, shape and density of the particles of inert refractory material and the velocity of the fluidising gas are such that the particles of inert refractory material are retained in the fluidised bed while the particulate material being heat treated is carried through the fluidised bed. The particulate material is retained within the fluidised bed for a time sufficient to effect the desired heat treatment thereof.

10 Claims, 4 Drawing Figures

HEAT TREATMENT OF PARTICULATE MATERIALS

This invention relates to the heat treatment of particulate materials and, more particularly but not exclusively, is concerned with the calcining of minerals such as the silicates of aluminium and of the alkaline earth metals.

The heat treatment of minerals such as the silicates of aluminium and of the alkaline earth metals by an operation known as "shock calcination" is disclosed in British Patent specifications Nos. 866,326 and 869,966 and essentially comprises the spraying of the silicates into a vortex of hot gases. These known processes, however, suffer from the disadvantage that the temperature varies within the reaction vessels and cannot be accurately controlled. Furthermore, the residence time of particles in the reaction vessels varies over a wide range and there is a strong tendency for the particles to agglomerate so that the particle size of the product also varies over a wide range.

It is an object of the present invention to provide a process for the heat treatment of particulate materials in which the above disadvantages can be overcome or inexacerbated.

According to the present invention there is provided a process for heat treating, e.g. calcining, a particulate material, which process comprises passing the particulate material through a heated fluidised bed comprising particles of an inert refractory material, wherein (i) the fluidised bed contains throughout the period in which the particulate material is passing therethrough a major proportion by weight of said inert refractory material; (ii) the size, shape and density of the particles of inert refractory material and the velocity of the fluidising gas are such that the particles of inert refractory material are retained in the fluidised bed while the particulate material is carried through the fluidised bed; and (iii) the particulate material is retained within the fluidised bed for a time sufficient to effect the desired heat treatment thereof.

Preferably, the inert refractory material consists of particles having a definite but narrow particle size distribution range, it being advantageous for the range of particle size of the inert refractory material to be such that the coarsest particles of the inert refractory material are not more than four times larger than the finest particles of the inert refractory material. It is also preferable for the shape and average particle size of the inert refractory material to be such that the linear gas velocity necessary to fluidise the inert refractory material is at least five times that necessary to convey the particulate material out of the fluidised bed.

The inert refractory material can be, for example, sand, silica or a ceramic material. Good results have been obtained when using as the inert refractory material a calcined kaolin clay, for example that sold under the Trade Mark "MOLOCHITE." When the particulate material to be heat treated consists predominantly of particles smaller than 50 microns equivalent spherical diameter, the inert refractory material is preferably selected from particles having a diameter in the range of from 0.5 to 5.0 mm.

Advantageously, the particles of the particulate material to be heat treated are fed pneumatically into the fluidised bed; but other feed methods, for example gravity feed, can alternatively be employed. It has also been found to be advantageous to feed the particles of the particulate material to be heat treated via a conduit passing longitudinally through the top of the fluidised bed reactor and extending into the fluidised bed, although laterally positioned conduits have also functioned satisfactorily. The fluidised bed is advantageously of the dense-phase type, but spouting fluidised beds can also be used.

A fluidised bed is formed when a fluid flows upwardly through a bed of suitably sized solid particles at a velocity sufficiently high to buoy the particles, to overcome the influence of gravity thereon, and to impart thereto an appearance of great turbulence.

The fluidising gas used to form the fluidised bed can be air, and advantageously the fluidising gas is also used to support the combustion of a fuel which provides the heat for the fluidised bed. The heating of the fluidised bed can be achieved, for example, by using hot combustion gases as the fluidising gas or by burning a fuel within the fluidised bed itself. This latter method is preferred because it allows the use of a fluidisation grid, or distribution plate, which does not need to withstand very high temperatures, as well as giving a more even temperature distribution within the fluidised bed. This allows a more evenly heat treated, e.g. calcined, product to be obtained. More preferably, the fluidised bed is initially heated by passing therethrough the combustion gases obtained from a conventional combustion chamber burning a liquid, gaseous or powdered solid fuel, and, when the temperature of the fluidised bed approaches the desired working temperature, the supply of combustion gases is stopped and fuel is injected into the fluidised bed, or at a point just below the fluidisation grid, so that ignition and combustion of the fuel takes place in the fluidised bed itself. The fuel injected into the fluidised bed can be liquid, gaseous or a powdered solid. One or more further fluidised beds can be provided above the first fluidised bed to ensure complete combustion of all the fuel injected into the lower bed.

Generally, the particles of the particulate material which are fed into the fluidised bed reactor should be dry or substantially dry. However, in certain circumstances, for example when the particulate material that is to be heat treated is to be used to form a cement, a slurry of the particulate material can be fed into the fluidised bed. This latter mode of operation, however, requires a high degree of heating if high temperatures are to be maintained within the fluidised bed.

Generally, if the particulate material to be heat treated is to be calcined, the fluidised bed will be operated at a temperature in the range of from 600° to 1,200° C. When calcining silicates of the alkaline earth metals or of aluminium, for example, the average residence time of the silicate particles within the heated fluidised bed should generally be 1 second or less. The residence times of individual particles of a particulate material within the fluidised bed should not normally exceed 3 seconds. The residence time of the particulate material in the fluidised bed is governed by the bed depth and the velocity of the gases passing up through the bed; the smaller the bed depth and the greater the gas velocity, the shorter will be the residence time of the particulate material in the fluidised bed. The gas velocity is affected in turn by the size, specific gravity and shape of the particles of inert refractory material, since there is a minimum gas velocity required to fluidise the particles. For particles of a given specific gravity and shape, the fluidising velocity is less for small particles than for large particles.

Separation of the heat treated particulate material from the fluidising gas can be performed by known methods, for example by using a cyclone or two or more cyclones arranged in series or in parallel. Other types of separator, for example electrostatic precipitators or bag filters, may also be used either alone or in conjunction with a cyclone or cyclones. The suspension of heat treated particulate materials in the fluidising gas is preferably cooled to below 300° C. either before or after passing through the separator(s) by injecting a cold fluid, e.g. water or air, into the suspension. It is advantageous to provide an exhaust fan which will draw the suspension through the separator and maintain the pressure in the reaction vessel very slightly below atmospheric pressure so that the particulate material and inert refractory material are not blown out through the feed conduit.

The process of the present invention enables close control of the temperature at which the particulate material is treated to be obtained and allows efficient heat transfer between the particulate material and the inert refractory material. In addition, the turbulence within the fluidised bed tends to minimise the tendency of the particulate material being heat treated to agglomerate.

For a better understanding of the invention, and to show how the same can be carried into effect, reference will now be made, by way of example, to the accompanying drawings, which show four embodiments of an apparatus for use in the process of the present invention. Similar reference numerals in the Figures refer to similar parts of the apparatus.

Referring first to FIG. 1, a fluidised bed of particles of inert refractory material 1 is supported on a perforated distribution plate 2 and is contained in a vessel 3 having thermally insulated walls 4. The fluidised bed is initially heated to near the working temperature by means of hot combustion gases from a combustion chamber 5 in which a fuel oil is burned in air. When the desired fluidised bed temperature has been reached, the supply of hot combustion gases is stopped and fuel oil is injected through a conduit 6 below the distribution plate of the fluidised bed, or through a conduit 7 above the distribution plate, or both. The particulate material which is to be heat treated, for example an uncalcined silicate, is injected as a suspension in air into the fluidised bed thorugh a conduit 8. Heat treated, e.g. calcined, particulate material leaves the apparatus through a conduit 9 which communicates with a cyclone separator 10. The gases leave the cyclone through a conduit 11 and the heat treated particulate material collects in the bottom of the cyclone whence it can be removed by opening, in turn, valves 12 and 13. A sight glass 14 is provided in the top of the vessel 3 to permit visual inspection of the fluidised bed, and a discharge conduit 15 permits discharge of the particles of inert refractory material from the vessel.

Figure 2:
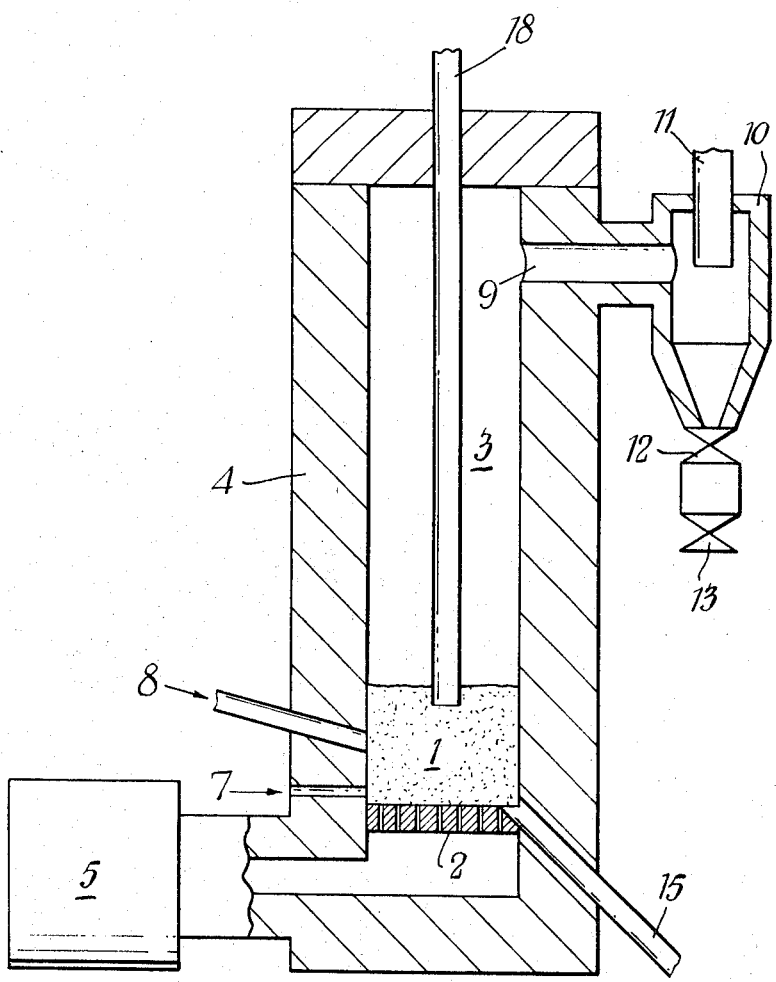

Referring next to FIG. 2, there is shown an embodiment of the invention in which the particulate material to be heat treated is injected into the fluidised bed, either through a conduit 18, which dips below the surface of the fluidised bed 1, or through a lateral conduit 8. This embodiment has a single fuel conduit 7.

Figure 3:
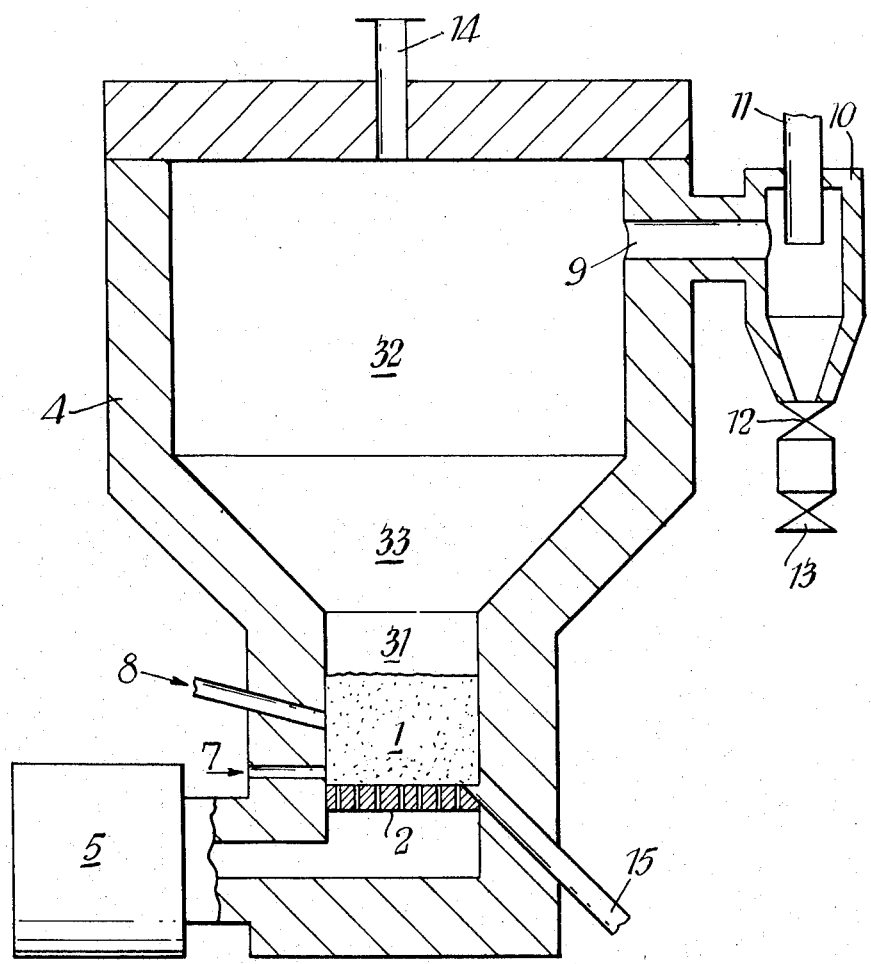

Referring next to FIG. 3, there is shown an embodiment of the invention in which a vessel 4 containing the fluidised bed comprises a section of relatively small cross-sectional area 31, a section of relatively large cross-sectional area 32 and a transitional section 33 of frusto-conical shape. This arrangement causes a decrease in the linear velocity of gases above the upper surface of the fluidised bed 1 when the apparatus is in use so that any oversize particles of particulate material being heat treated, or any particles of inert refractory material which have been carried out of the fluidised bed, are returned to the fluidised bed.

Figure 4:
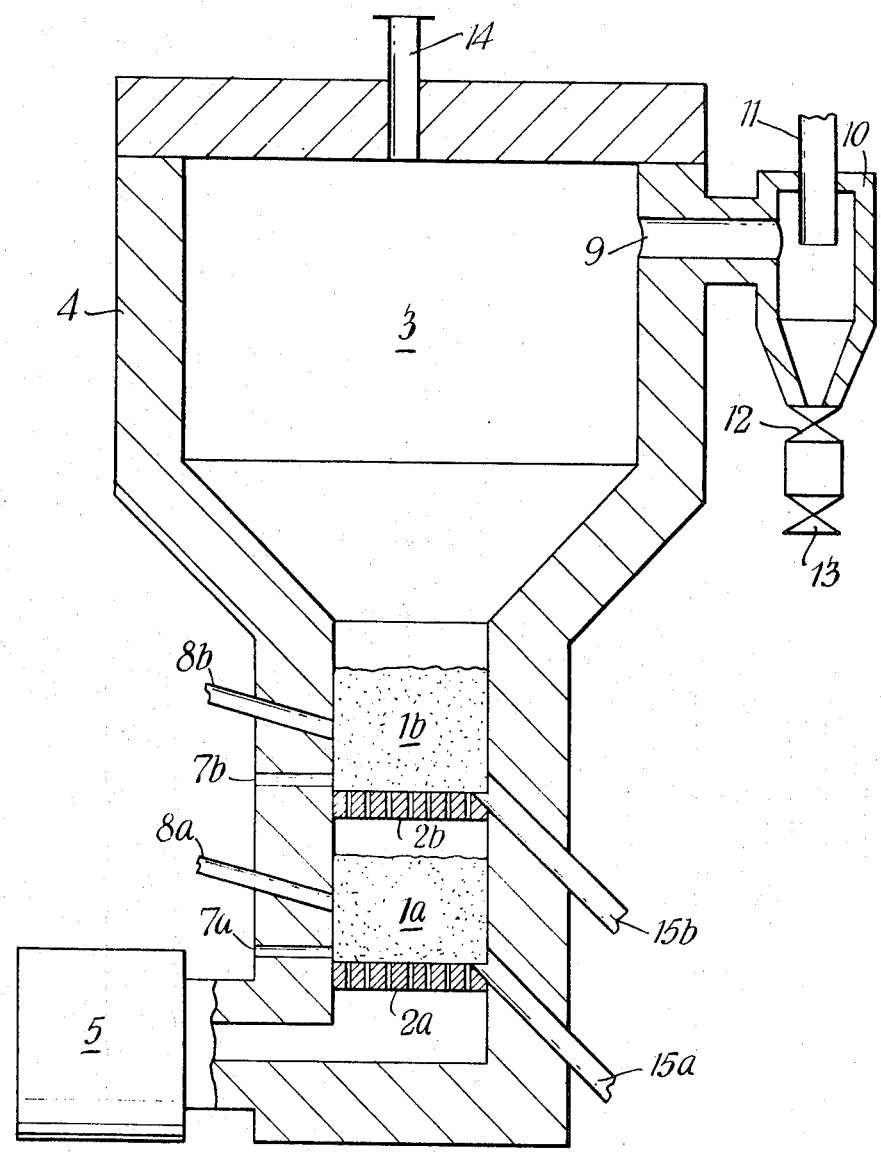

Referring next to FIG. 4, there is shown an embodiment of the invention in which a vessel 4 contains two fluidised beds 1a and 1b which are supported on perforated distribution plates 2a and 2b respectively. Fuel for combustion in the vessel, e.g. fuel oil, can be injected into either or both of the fluidised beds through conduits 7a and 7b. The particulate material which is to be heat treated is injected, preferably in suspension in air, into either or both of the fluidised beds through conduits 8a and 8b. Discharge conduits 15a and 15b permit discharge of the inert refractory material from the vessel.

The invention is further illustrated by the following Examples.

EXAMPLE 1

A kaolinitic clay mineral, from which particles having an equivalent spherical diameter greater than 5 microns had been removed by gravitational and centrifugal separation and which comprised 80 percent by weight of particles smaller than 2 microns equivalent spherical diameter, was fed pneumatically into the apparatus described above with reference to FIG. 1 of the accompanying drawings. The apparatus contained a fluidised bed having a diameter of 10½ inches and containing approximately 30lbs of MOLOCHITE. The MOLOCHITE had a particle size distribution such that substantially all the particles passed thorugh a ⅛th of an inch mesh sieve and were retained on a No. 8 mesh British Standard sieve. The pressure drop across the fluidised bed was 10 inches water gauge. The initial inlet temperature of combustion gases to the fluidised bed was 1,480° C., and the operational temperature of the fluidised bed was 1,100° C. Gas flow through the fluidised bed was 78 cubic feet per minute, and the feed rate of ground kaolinitic clay mineral was 61 lbs/hr. Under these conditions, the calcined material had the properties noted in Table I below, which are compared with the initial properties of the kaolinitic clay mineral.

TABLE I

| Property | Before Treatment | After Treatment |
| --- | --- | --- |
| Valley abrasion value | 30 | 101 |
| Specific gravity | 2.64 | 2.14 |
| Loss on ignition (weight %) | 13.1 | 0.2 |
| Percent by weight smaller than 2 microns | 80 | 22 |
| Brightness* | 89.5/93.0 | 89.1/91.9 |

* Measured as % reflectance to light of 458 mµ/574 mµ wavelength on an Elrepho brightness meter.

EXAMPLE 2

A kaolinitic clay mineral similar to that used in Example 1 above was treated as described in Example 1, except that the initial inlet temperature of combustion gases to the fluidised bed was 1,180° C., the bed temperature was 900° C., the air flow through the fluidised bed was 90 cubic feet per minute, and the feed rate of kaolinitic clay mineral was 55 lbs/hr. The results obtained are set out in Table II below.

TABLE II

| Property | Before Treatment | After Treatment |
|---|---|---|
| Valley abrasion value | 30 | 101 |
| Specific gravity | 2.64 | 2.30 |
| Loss on ignition (weight %) | 13.1 | 0.5 |
| Percent by weight smaller than 2 microns | 80 | 19 |
| Brightness* | 89.5/93.0 | 86.7/90.7 |

* Measured as % reflectance to light of 458 mμ/574 mμ wavelength on an Elrepho brightness meter.

EXAMPLE 3

A kaolinitic clay mineral similar to that employed in Examples 1 and 2 above was treated as described in Example 1, except that the inlet temperature of combustion gases to the fluidised bed was 920° C., the bed operating temperature was 700° C., the air flow through the fluidised bed was 108 cubic feet per minute, and the feed rate of kaolinitic clay mineral was 65 lbs/hr. The results obtained are set out in Table III below.

TABLE III

| Property | Before Treatment | After Treatment |
|---|---|---|
| Valley abrasion value | 30 | 109 |
| Specific gravity | 2.64 | 2.46 |
| Loss on ignition (weight %) | 13.1 | 2.0 |
| Percent by weight of particles smaller than 2 microns | 80 | 21 |
| Brightness* | 89.5/93.0 | 84.3/88.6 |

* Measured as % reflectance to light of 458 mμ/574 mμ wavelength on an Elrepho brightness meter.

EXAMPLE 4

A kaolin clay comprising 80 percent by weight of particles smaller than 2 microns equivalent spherical diameter was treated as described in Example 1 above, except that the initial inlet temperature of combustion gases to the fluidised bed was 1,250° C., the bed temperature was 1,000° C., the air flow through the fluidised bed was 85 cubic feet per minute, and the feed rate of kaolin was 55 lb/hour. The calcined product was air classified and the fine product of the classification process was found to have a particle size distribution such that 34 percent by weight consisted of particles smaller than 2 microns equivalent spherical diametr, 8 percent by weight of particles larger than 10 microns equivalent spherical diameter and 0.02 percent by weight of particles larger than 53 microns. The specific gravity was 2.15, the loss on ignition 0.647 percent by weight, the percentage reflectance to light of 458 nm, wavelength was 86.5 and to light of 574 nm. wavelength was 89.8. This material is referred to hereinafter as "Filler A."

A second mineral filler, hereinafter referred to as "Filler B," was a kaolin clay which had been calcined in a conventional multiple hearth furnace at a maximum temperature of 950° C. for a total time of 4 hours and the final product has a particle size distribution such that 10 percent by weight consisted of particles having an equivalent spherical diameter larger than 10 microns and 50 percent by weight consisted of particles having an equivalent spherical diameter smaller than 2 microns. The specific gravity was 2.50 and the percentage reflectance to light of 458 nm wavelength was 88.0.

Each of the two fillers A and B were incorporated into butyl rubber compounds A and B according to the recipes given in Table IV below:

Table IV

| Component | Parts by weight compound A | compound B |
|---|---|---|
| Butyl rubber (0.65 mole % unsaturation) | 100 | 100 |
| Process oil | 5 | 5 |
| Paraffin wax | 5 | 5 |
| Zinc oxide | 5 | 5 |
| Sulphur | 1 | 1 |
| p-quinone dioxime dibenzoate | 6 | 6 |
| Red lead | 9 | 9 |
| Filler A | 108 | - |
| Filler B | - | 130 |

Batches of each of the two compounds were cured in a steam heated press at 160° C. for 40 minutes and the cured sheets were subjected to tests for modulus at 300 percent elongation, tensile strength, percent elongation at break, hardness and tear strength. The tests were all carried out in accordance with B.S. 903 and the results are given in Table V below.

TABLE V

| Property | compound A | compound B |
|---|---|---|
| Modulus at 300% elongation lbf/in² (Kgf/cm²) | 375 (26.4) | 390 (27.4) |
| Tensile strength lbs/in² (Kgf/cm²) | 540 (38.0) | 515 (36.2) |
| Elongation at break % | 555 | 515 |
| Hardness IRHD | 60 | 58 |
| Tear strength lbf (kgf) | 11.1 (5.03) | 11.1 (5.03) |

These results show that there is no significant difference in mechanical properties between Compound A and Compound B. However, Filler A has a lower specific gravity than Filler B and therefore a smaller weight is required to fill a given volume. Rubber fillers are generally bought by weight and therefore a saving in cost may be effected. In addition Filler A has a slightly different refractive index from that of the rubber matrix and therefore has some pigmenting properties. Filler B has a refractive index which is substantially the same as that of the rubber matrix.

The cured compounds were also subjected to tests for electrical insulation properties after immersion in water at 50° C. in accordance with B.S. 2899 part 3. The results are shown in Table VI below.

TABLE VI

| | compound A | compound B |
|---|---|---|
| % increase in capacitance after immersion at 50°C for | | |
| 1 – 14 days | 7.1 | 5.3 |
| 7 – 14 days | 5.3 | 2.5 |
| Permittivity after 14 days immersion at 50°C. | 4.3 | 4.1 |
| Power factor after 14 days immersion at 50°C. | 0.011 | 0.011 |

There is no significant difference between the results for Compound A and Compound B.

EXAMPLE 5

A kaolin clay comprising 80 percent by weight of particles smaller than 2 microns equivalent spherical diameter was treated as described in Example 1 above, except that the initial inlet temperature of combustion gases to the fluidised bed was 1,250° C., the bed temperature was 1,000° C., the air flow through the fluidised bed was 85 cubic feet per minute, and the feed rate of kaolin was 55 lb/hr.

The final product had a specific gravity of 2.2, a loss on ignition of 0.025 percent by weight, a percentage reflectance to light of 458 nm. wavelength of 87.2 and to light of 574 nm. wavelength of 91.9 and a particle size distribution such that 23 percent by weight consisted of particles smaller than 2 microns equivalent spherical diameter, 12 percent by weight consisted of particles larger than 10 microns equivalent spherical diameter and 0.03 percent by weight consisted of particles larger than 53 microns. This material is hereinafter referred to as "Extender A."

A second mineral material, hereinafter referred to as "Extender B," was a kaolin clay which had been flash calcined in a conventional manner by passing the clay in powder form rapidly through an oil-fired combustion chamber at 850° C. The material had a specific gravity of 2.0 and a particle size distribution such that 35 percent by weight consisted of particles smaller than 2 microns equivalent spherical diameter.

Two exterior grade emulsion paints were made up according to the following recipe. Paint A contained Extender A and Paint B contained Extender B.

| | % by weight |
|---|---|
| Rutile titanium dioxide | 20.6 |
| Extender A or B | 12.6 |
| 2% solution of hydroxy ethyl cellulose | 17.4 |
| 5% dispersant solution | 3.9 |
| Butyl carbitol acetate | 1.0 |
| Water | 10.9 |
| Vinyl acetate/vinyl versatic acid ester copolymer at 50% by weight solids | 33.5 |

Small quantities of anti-freeze, rust inhibitor, fungicide and defoamer.

The pigment volume concentration was 40 percent. The two paints were subjected to tests for film brightness, dispersion and opacity (contrast ratio) and the results are given in Table VII below.

TABLE VII

| Property | Paint A | Paint B |
|---|---|---|
| Film brightness[1] % MgO = 100%) | 89.3 | 88.2 |
| Dispersion[2] um | 25 | 35 |
| Opacity[3] (contrast ratio) | 93.0 | 92.3 |

Notes:

1. The film brightness test comprised applying a film of the paint at a constant thickness of 0.0032 inch (0.081 mm) to a sheet of "MELINEX" plastics material and cutting five discs from the coated sheet. The five discs were stacked and five measurements of the brightness of the top disc of the stack were made using an ELREPHO brightness meter with light of 457 nm. wavelength. Between each measurement the bottom disc of the stack was transferred to the top, and the average of the five measurements was calculated.

2. The dispersion test was performed by drawing down each paint on a Hegman gauge. Both paints had previously been mixed in the same laboratory SILVERSON shrouded-impeller mixer for a standard time of 25 minutes.

3. The opacity test comprised applying a film of the paint at a constant thickness of 0.0032 inches (0.081 mm) using a draw bar over Morest charts No.102 which have equal black and white portions. The percentage reflectance (MgO = 100 percent) to light of 540 nm wavelengths of the film over the black and white portions were measured with an ELREPHO brightness meter. The contrast ratio was calculated by the formula:

contrast ratio = % reflectance over black portion/% reflectance over white portion ×100

Additional qualitative tests were performed to compare the brushability, flow, visual opacity, visual brightness and can stability of the two paints. Paint A was observed to have superior brushability, flow, visual opacity and visual brightness properties to Paint B, but the two paints had similar good can stability.

I claim:

1. A process for heat treating a particulate material which is a silicate of aluminum or of an alkaline earth metal and which essentially consists of particles smaller than 50 microns equivalent spherical diameter, which process comprises passing the particulate material through a fluidized bed heated to a temperature in the range 600° C. to 1,200° C., wherein the fluidized bed comprises particles of an inert refractory material having diameters in the range of from 0.5 to 5.0 millimeters a particle size distribution such that the coarsest particles of the inert refractory material are not more than four times larger than the finest particles of the inert refractory material, wherein throughout the period in which the particulate material is passing through the heated fluidized bed the inert refractory material constitutes a major proportion by weight of said fluidized bed, and wherein the size, shape and density of the particles of the inert refractory material are such that the linear gas velocity necessary to fluidize the inert refractory material is at least five times that necessary to convey out of the fluidized bed the particulate material which is to be heat treated whereby the particles of inert refractory material are retained in the fluidized bed while the particulate material to be treated is carried through the fluidized bed and is within the fluidized bed for an average residence time of not more than one second.

2. A process according to claim 1 wherein the inert refractory material is selected from the group consisting of sand, silica and ceramic materials.

3. A process according to claim 1 wherein the inert refractory material is a calcined kaolin clay.

4. A process according to claim 1 wherein the particulate material to be treated is a kaolinitic clay mineral.

5. A process according to claim 4 wherein the fluidized bed is heated to a temperature in the range of from about 700° C. to about 1,100° C.

6. A process according to claim 1 wherein the particulate material to be treated is fed pneumatically into the fluidized bed.

7. A process according to claim 5 wherein the particulate material to be treated is fed into the fluidized bed via a conduit passing longitudinally through the top of a reactor containing the fluidized bed to a position below the surface of the fluidized bed.

8. A process according to claim 1 wherein the fluidized bed is heated by burning a fuel therein.

9. A process according to claim 1 wherein the fluidized bed is initially heated by passing hot combustion gases therethrough until the temperature of the fluidized bed approaches the desired working temperature and thereafter the supply of hot combustion gases is stopped and a fuel is injected into the fluidized bed and burnt therein.

10. A process according to claim 1 wherein after passing through said heated fluidized bed, the particulate material to be heat treated passes directly through a second heated fluidized bed arranged above the first fluidized bed.

* * * * *